W. McMURRY.
Churn.
No. 197,786. Patented Dec. 4, 1877.
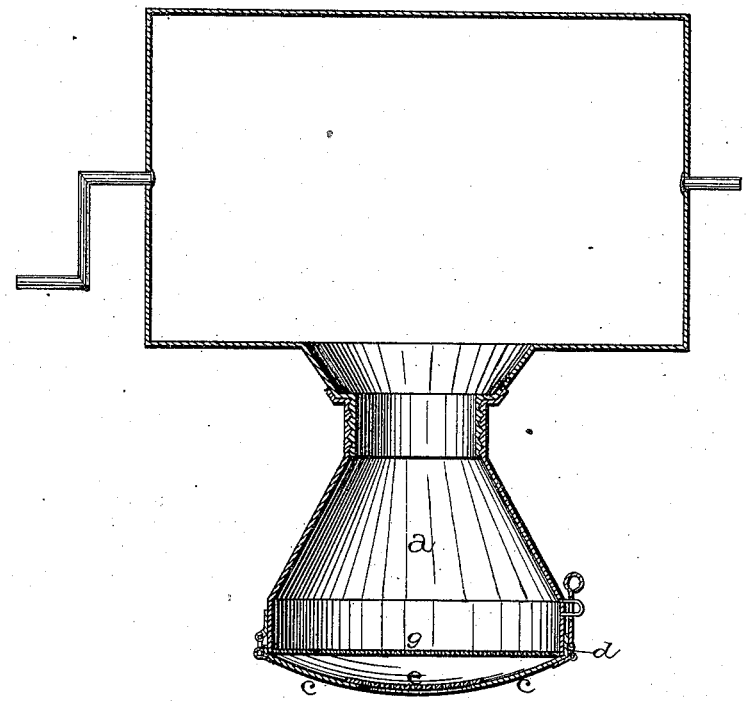

UNITED STATES PATENT OFFICE

WILLIAM McMURRY, OF OBION COUNTY, TENNESSEE.

IMPROVEMENT IN CHURNS.

Specification forming part of Letters Patent No. 197,786, dated December 4, 1877; application filed October 26, 1877.

*To all whom it may concern:*

Be it known that I, WILLIAM MCMURRY, of the county of Obion, and State of Tennessee, have invented certain new and useful Improvements in Milk-Strainers; and I do hereby declare the following to be a full, clear, and exact description of the invention, such as will enable others skilled in the art to which it pertains to make and use it, reference being had to the accompanying drawings, which form part of this specification.

My invention relates to an improvement in strainers, and is intended especially for revolving churns; and it consists in the arrangement and combination of parts that will be more fully described hereinafter.

The accompanying drawing represents my invention.

*a* represents the body of my strainer, which is made conical in shape, and provided with a screw-thread on its lower end, so as to screw it tightly to the churn. Hinged or otherwise fastened to the top of the strainer is the cover *c*, which is provided with a flange, *d*, all around its edge, so as to catch tightly over the top of the strainer, and thus prevent leakage when the milk, cream, and butter are being poured from the churn. Through the center of this cover is made an opening, which is covered with wire-gauze *e*, for the milk to pass freely through. Inside of the strainer is loosely placed the strainer or perforated disk *g*, which rests upon the top of the inclined portion of the body *a*.

In pouring milk into the churn, this body acts as a funnel, and the disk *g* as a strainer. After the churning is over, the cover of the churn is removed. The whole strainer, as above described, is screwed on, and then the churn-body is turned over. The whole contents of the churn at once runs into the strainer, and while the butter is caught upon the disk *g*, the milk will pass down through and out of the strainer *e*, thus being strained twice. It is then only necessary to open the cover *c*, and the disk *g*, with all the butter upon it, drops down upon the hand. The very act of emptying the churn separates the milk from the butter.

Having thus described my invention, claim—

1. The body *a*, provided with the cover having the flange *d* and strainer *e*, substantially as shown.

2. In combination with a revolving churn body, the funnel-shaped body *a*, lid *c*, flange *d*, strainer *e*, and disk *g*, substantially as described.

In testimony that I claim the foregoing have hereunto set my hand this 18th day October, 1877.

WILLIAM McMURRY.

Witnesses:
J. W. DAYTON,
B. P. REESE.